United States Patent
Blake et al.

(10) Patent No.: US 10,731,482 B2
(45) Date of Patent: Aug. 4, 2020

(54) ENHANCED ADHESION THERMAL BARRIER COATING

(71) Applicant: United Technologies Corporation, Farmington, CT (US)

(72) Inventors: Mosheshe Camara-Khary Blake, Manchester, CT (US); Thomas N. Slavens, Moodus, CT (US); John R. Farris, Bolton, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1207 days.

(21) Appl. No.: 14/959,057

(22) Filed: Dec. 4, 2015

(65) Prior Publication Data

US 2017/0159460 A1 Jun. 8, 2017

(51) Int. Cl.

| | |
|---|---|
| *F01D 5/28* | (2006.01) |
| *F01D 11/12* | (2006.01) |
| *F01D 9/04* | (2006.01) |
| *F01D 11/08* | (2006.01) |
| *F01D 25/08* | (2006.01) |

(Continued)

(52) U.S. Cl.
CPC .............. *F01D 5/288* (2013.01); *F01D 9/041* (2013.01); *F01D 11/08* (2013.01); *F01D 11/12* (2013.01); *F01D 25/08* (2013.01); *F01D 25/24* (2013.01); *F02C 3/04* (2013.01); *F02C 7/00* (2013.01); *F05D 2220/32* (2013.01);
(Continued)

(58) Field of Classification Search
CPC .......... F01D 5/288; F01D 11/12; F01D 11/08; F01D 25/08; F01D 9/041; F02C 7/00; F05D 2230/90; F05D 2260/231; F05D 2300/611; C23C 4/10; C23C 4/01; C23C 30/00

See application file for complete search history.

(56) References Cited

U.S. PATENT DOCUMENTS

| 4,335,190 A | 6/1982 | Bill et al. | |
|---|---|---|---|
| 5,209,644 A * | 5/1993 | Dorman | .................. F01D 5/145 |
| | | | 415/914 |

(Continued)

FOREIGN PATENT DOCUMENTS

| DE | 10357180 | 6/2005 |
|---|---|---|
| EP | 1013795 | 6/2000 |

(Continued)

OTHER PUBLICATIONS

European Search Report for Application No. 16201967.3 dated Apr. 5, 2017.

*Primary Examiner* — Richard A Edgar
*Assistant Examiner* — Maxime M Adjagbe
(74) *Attorney, Agent, or Firm* — Carlson, Gaskey & Olds, P.C.

(57) ABSTRACT

A gas turbine engine including a compressor section, a combustor section fluidly connected to the compressor section, a turbine section fluidly connected to the combustor section, and a plurality of gas path components exposed to a primary fluid flowpath through the compressor section, the combustor section and the turbine section. At least one of the gas path components includes an exterior facing surface, a lattice structure extending outward from the exterior facing surface, the lattice structure being integral to the exterior facing surface, and a thermal barrier coating adhered to at least a portion of the exterior facing surface and the lattice structure.

5 Claims, 5 Drawing Sheets

(51) Int. Cl.
  *F01D 25/24* (2006.01)
  *F02C 3/04* (2006.01)
  *F02C 7/00* (2006.01)

(52) U.S. Cl.
  CPC .... *F05D 2230/90* (2013.01); *F05D 2260/231* (2013.01); *F05D 2300/611* (2013.01); *Y02T 50/6765* (2018.05)

(56) References Cited

U.S. PATENT DOCUMENTS

| | | | |
|---|---|---|---|
| 5,236,745 A * | 8/1993 | Gupta | C23C 4/02 |
| | | | 427/454 |
| 5,866,271 A * | 2/1999 | Stueber | C23C 28/00 |
| | | | 148/240 |
| 6,045,928 A | 4/2000 | Tsantrizos et al. | |
| 6,365,281 B1 | 4/2002 | Subramanian et al. | |
| 6,599,568 B2 | 7/2003 | Lee et al. | |
| 7,090,894 B2 | 8/2006 | Carper et al. | |
| 8,999,514 B2 | 4/2015 | Watwe et al. | |
| 9,133,719 B2 | 9/2015 | Witz et al. | |
| 2001/0004436 A1 | 6/2001 | Chasripoor et al. | |
| 2007/0141368 A1* | 6/2007 | Farmer | F01D 5/288 |
| | | | 428/469 |
| 2009/0017260 A1* | 1/2009 | Kulkarni | C23C 4/18 |
| | | | 428/161 |
| 2011/0031189 A1 | 2/2011 | Vorobiev | |
| 2011/0110790 A1 | 5/2011 | Itzel et al. | |
| 2014/0127005 A1 | 5/2014 | Schreiber | |
| 2014/0199175 A1* | 7/2014 | Godfrey | F01D 5/14 |
| | | | 416/241 R |

FOREIGN PATENT DOCUMENTS

| | | |
|---|---|---|
| EP | 2174740 | 4/2010 |
| WO | 2016133580 | 8/2016 |

\* cited by examiner

ENHANCED ADHESION THERMAL BARRIER COATING

TECHNICAL FIELD

The present disclosure relates generally to thermal barrier coatings for gas powered turbine components, and more specifically to a system and process for enhancing adhesion between the thermal barrier coating and an underlying surface of a component for a gas powered turbine

BACKGROUND

In order to increase efficiencies of gas turbine engines, gas turbine engine manufacturers rely on extreme turbine inlet temperatures to provide a boost to the overall engine performance. In some modern gas turbine engine applications, the gas path temperatures within the turbine exceed the melting point of the constituent materials from which the underlying components of the gas path are constructed. To address the extreme heat, cooling systems are used to cool the gas path components in the turbine.

One exemplary mechanism for cooling turbine gas path components is a ceramic thermal barrier coating (TBC) adhered to an exterior surface of the gas path component. The presence of the thermal barrier coating significantly reduces the operating temperature of the component and allows for lower cooling flow requirements.

SUMMARY OF THE INVENTION

In one exemplary embodiment a gas turbine engine component includes an exterior facing surface, a lattice structure extending outward from the exterior facing surface, the lattice structure being integral to the exterior facing surface, and a thermal barrier coating adhered to at least a portion of the exterior facing surface and the lattice structure.

In another exemplary embodiment of the above described gas turbine engine component the lattice structure extends a first distance outward from the exterior facing surface and wherein the first distance is less than a thickness of the thermal barrier coating.

In another exemplary embodiment of any of the above described gas turbine engine components the lattice structure is at least partially an artifact of a manufacturing process.

In another exemplary embodiment of any of the above described gas turbine engine components the manufacturing process is an additive metal manufacturing process.

In another exemplary embodiment of any of the above described gas turbine engine components the exterior facing surface includes a plurality of through holes, and wherein the thermal barrier is characterized by not obstructing the through holes.

In another exemplary embodiment of any of the above described gas turbine engine components the exterior facing surface and the lattice structure have a combined surface roughness (Ra) in the range of 100-600.

In another exemplary embodiment of any of the above described gas turbine engine components a surface roughness of an exterior surface of the thermal barrier coating is less than 100 Ra.

In another exemplary embodiment of any of the above described gas turbine engine components the combined surface roughness (Ra) is greater than 180.

In another exemplary embodiment of any of the above described gas turbine engine components the lattice structure is disposed across less than 100% of the exterior surface.

In another exemplary embodiment of any of the above described gas turbine engine components the component is one of a blade outer air seal, a blade and a vane.

An exemplary method for manufacturing a gas path component for a gas powered turbine includes additively manufacturing a first component structure and a support structure, wherein the support structure is integral to the first component structure, partially removing the support structure via a finishing process such that an artifact of the support structure remains integral to the first component structure, and applying a thermal barrier coating to the first component structure, wherein the thermal barrier coating is adhered to the first component structure and the artifact of the support structure.

In another example of the above described method for manufacturing a gas path component for a gas powered turbine applying the thermal barrier includes applying a metallic bondcoat and applying a ceramic topcoat.

In another example of any of the above described exemplary methods for manufacturing a gas path component for a gas powered turbine additively manufacturing the first component structure and the support structure includes constructing a lattice structure on at least one external surface of the first component structure.

In another example of any of the above described exemplary methods for manufacturing a gas path component for a gas powered turbine the thickness of the thermal barrier coating is larger than a height of the artifact of the support structure normal to the surface of the first component structure on which the artifact of the support structure is disposed.

In another example of any of the above described exemplary methods for manufacturing a gas path component for a gas powered turbine partially removing the support structure via the finishing process comprises applying the finishing process until a combined surface roughness of the first component structure and the artifact of the support structure has a combined surface roughness (Ra) in the range of 100-600.

In another example of any of the above described exemplary methods for manufacturing a gas path component for a gas powered turbine partially artifact of the support structure is disposed across less than 100% of the exterior surface of the first component structure.

In one exemplary embodiment a gas turbine engine includes a compressor section, a combustor section fluidly connected to the compressor section, a turbine section fluidly connected to the combustor section, and a plurality of gas path components exposed to a primary fluid flowpath through the compressor section, the combustor section and the turbine section. At least one of the gas path components includes an exterior facing surface, a lattice structure extends outward from the exterior facing surface, the lattice structure being integral to the exterior facing surface, and a thermal barrier coating adhered to at least a portion of the exterior facing surface and the lattice structure.

In another exemplary embodiment of the above described gas turbine engine the at least one of the gas path components includes one of a blade outer air seal, a blade, and a vane.

In another exemplary embodiment of any of the above described gas turbine engines the lattice structure is at least partially an artifact of an additive manufacturing process.

In another exemplary embodiment of any of the above described gas turbine engines a combined surface roughness of the exterior facing surface and the lattice structure is a first magnitude and a combined surface roughness of the thermal barrier coating, the exterior facing surface, and the lattice structure has a second magnitude, the second magnitude being less than the first magnitude.

These and other features of the present invention can be best understood from the following specification and drawings, the following of which is a brief description.

DETAILED DESCRIPTION OF AN EMBODIMENT

Figure 1:
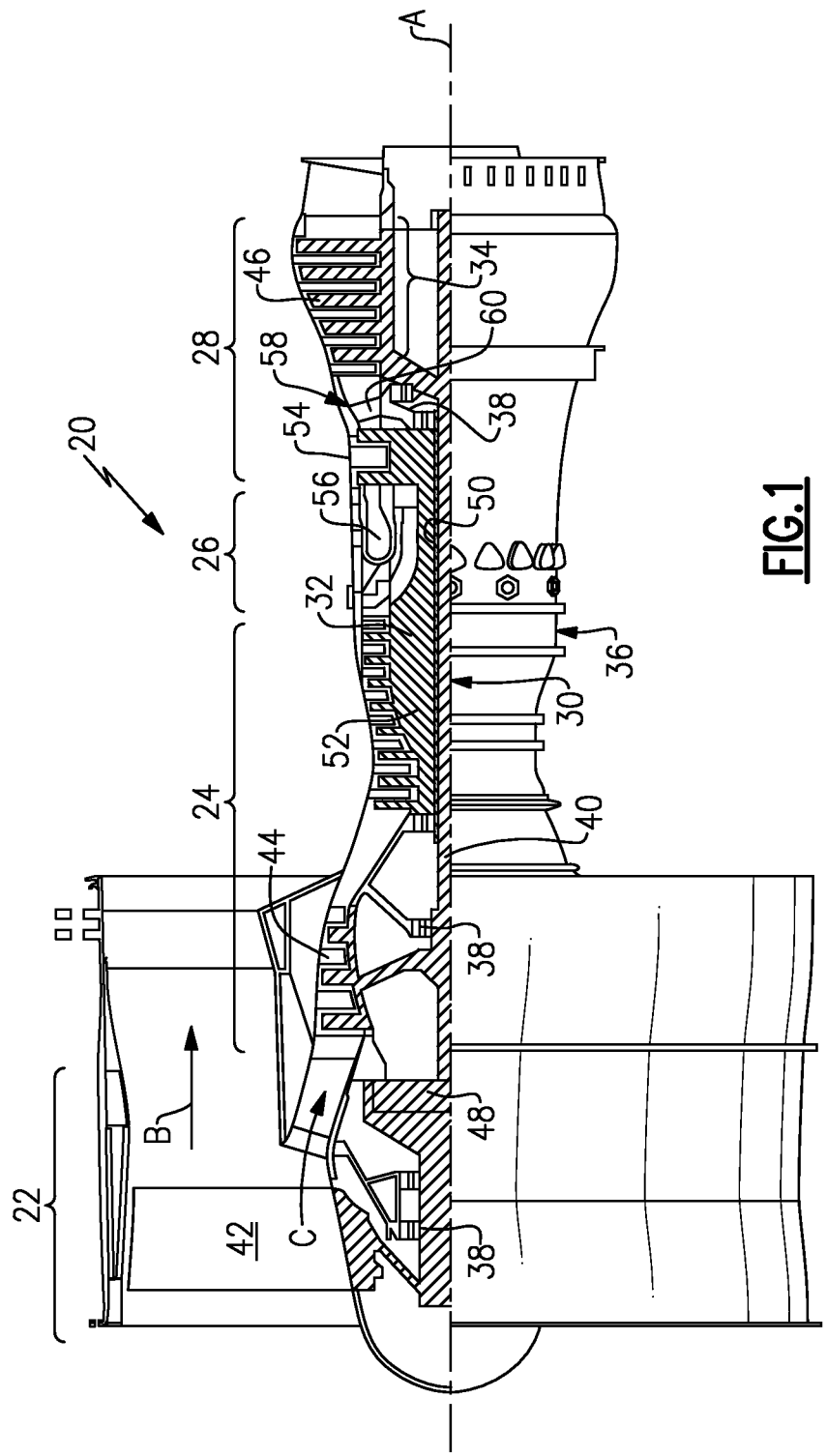
FIG. 1 schematically illustrates an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (1066.8 meters). The flight condition of 0.8 Mach and 35,000 ft (1066.8 m), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 m/s).

Turbine engine components, alternately referred to as gas path components, that are exposed to the combustion products formed in the combustor section 26 are exposed to extreme temperatures during operation of the gas powered turbine. In order to prevent damage to the gas path components, a ceramic thermal barrier coating is adhered to surfaces of the gas path components that are exposed to the gas path. The ceramic thermal barrier coating reduces the operating temperature of the component and allows lower cooling flow requirements for active cooling systems used to cool the gas path components.

In some exemplary systems, ceramic thermal barrier coatings are susceptible to breakage due to mechanical spallation. The breakage in such examples is accelerated in regions with high surface curvature and/or high heat load. By way of example, the leading edge of an airfoil is typically curved in such a manner.

Figure 2:
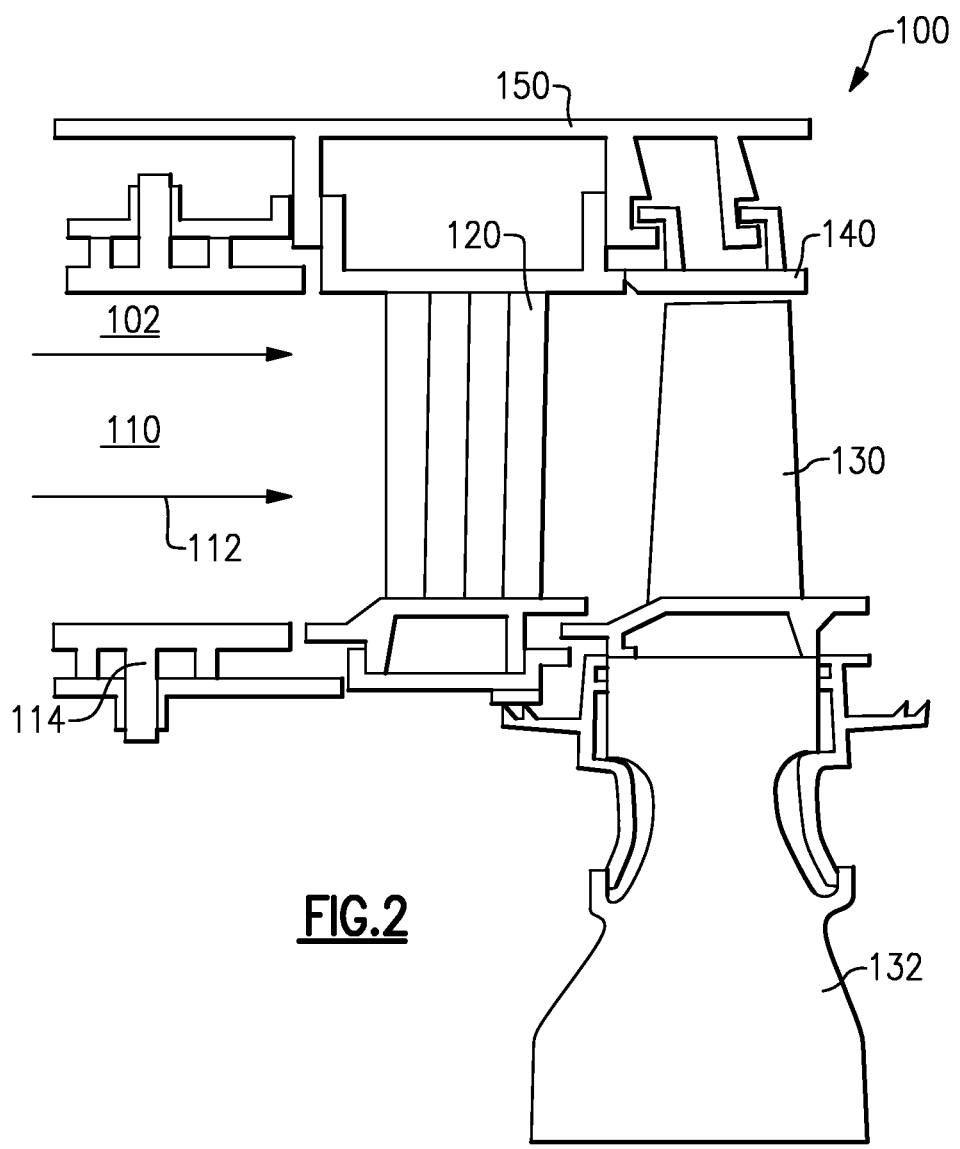
FIG. 2 schematically illustrates an exemplary portion of a turbine gaspath.

With continued reference to FIG. 1, FIG. 2 schematically illustrates a turbine inlet 100 immediately aft of a combustor 110. Combustion products 112 are expelled from the combustor 110 along a gas path 102. Disposed within the gas path 102 are a vane 120 and a blade 130. The blade 130 is supported by a disk 132 according to standard turbine blade constructions. Radially outward of the blade 130 is a blade outer air seal 140. Both the blade outer air seal 140 and the vane 120 are supported by an engine case structure 150. Each of the surfaces of the vane 120, blade 130, and blade outer air seal 140 that are exposed to the combustion products 112 in the gas path 102 are at least partially coated with a thermal barrier coating.

Figure 3:
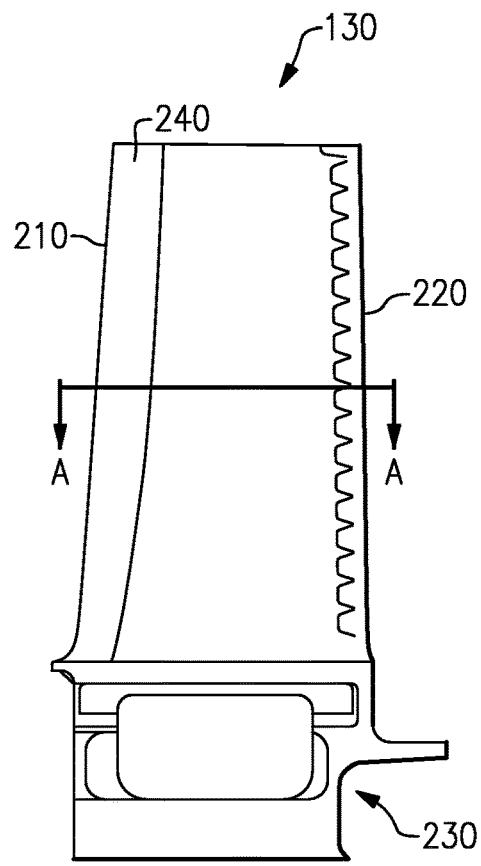
FIG. 3 schematically illustrates the blade of FIG. 2 isolated from the turbine gaspath.
Figure 4:
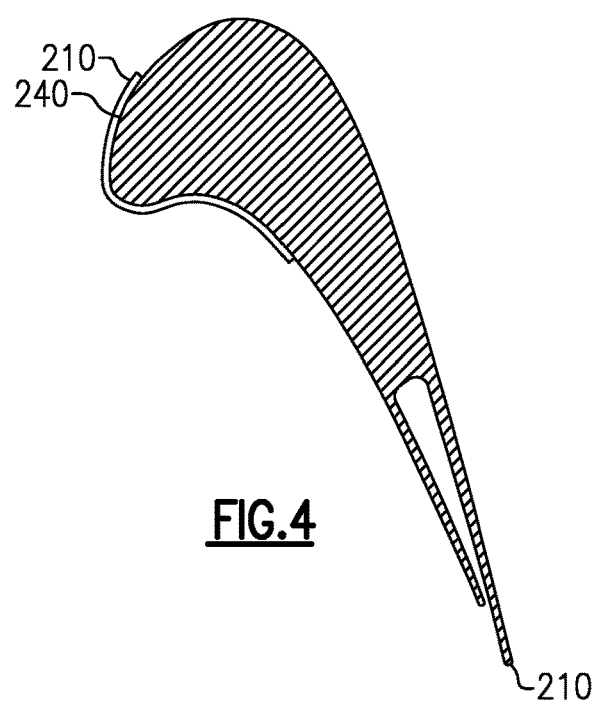
FIG. 4 schematically illustrates a cross sectional view of the blade of FIG. 3.

With continued reference to FIG. 2, FIG. 3 schematically illustrates the blade 130 of FIG. 2 isolated from the gas path structure. Similarly, FIG. 4 illustrates a cross sectional view of the blade 130 of FIG. 2 along cross section lines A-A. The blade 130 includes a leading edge 210 and a trailing edge 220. A root section 230 connects the blade 130 to the disk 132 (illustrated in FIG. 2). A thermal barrier coating 240 is applied to the leading edge 210 of the blade 130. In alternative examples, the thermal barrier coating 240 can be applied to the entire blade 130, instead of being limited to the leading edge 210. Some example gas path components include holes disposed on the surface connecting an internal cavity to the exterior of the gas path component. In such examples, the thermal barrier coating does not cover or impede the through holes.

Figure 5:
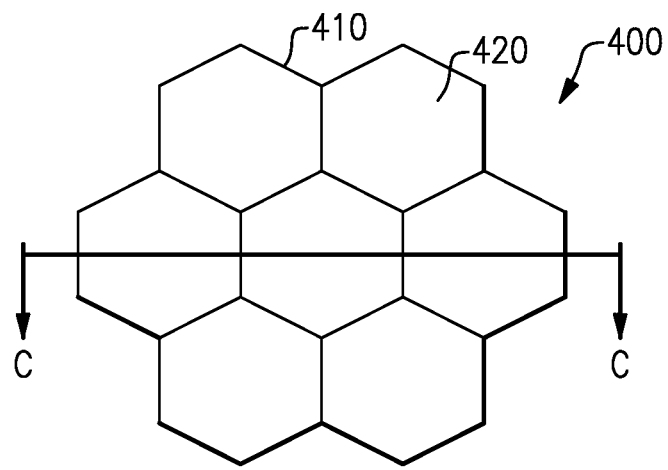
FIG. 5 schematically illustrates an exemplary lattice structure on a surface of the blade of FIG. 2.

Due to the curvature of the leading edge 210, adherence of the thermal barrier coating 240 to the exterior facing surface of the blade structure is reduced under extreme heat loads, and mechanical spallation can result. In order to increase the adherence of the thermal barrier coating 240 to the exterior facing surface of the blade structure, a lattice structure (illustrated in FIG. 5) is disposed on the leading edge 210 of the blade 130. The lattice structure protrudes outward from the exterior facing surface of the blade 130 and is covered by the thermal barrier coating 240.

Figure 6:
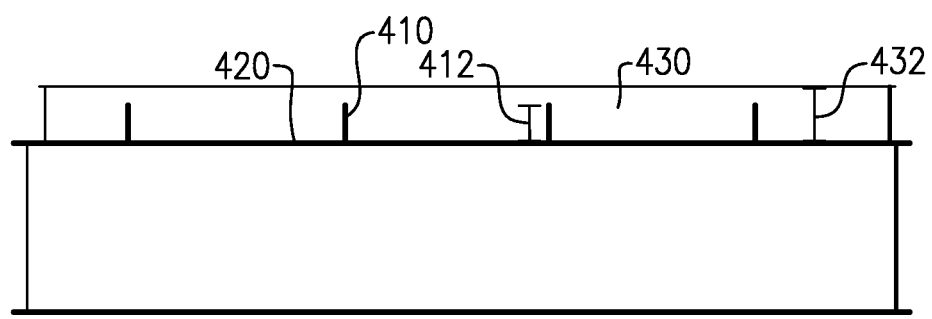
FIG. 6 schematically illustrates a partial cross sectional view of the exemplary lattice pattern of FIG. 5.
Figure 7:
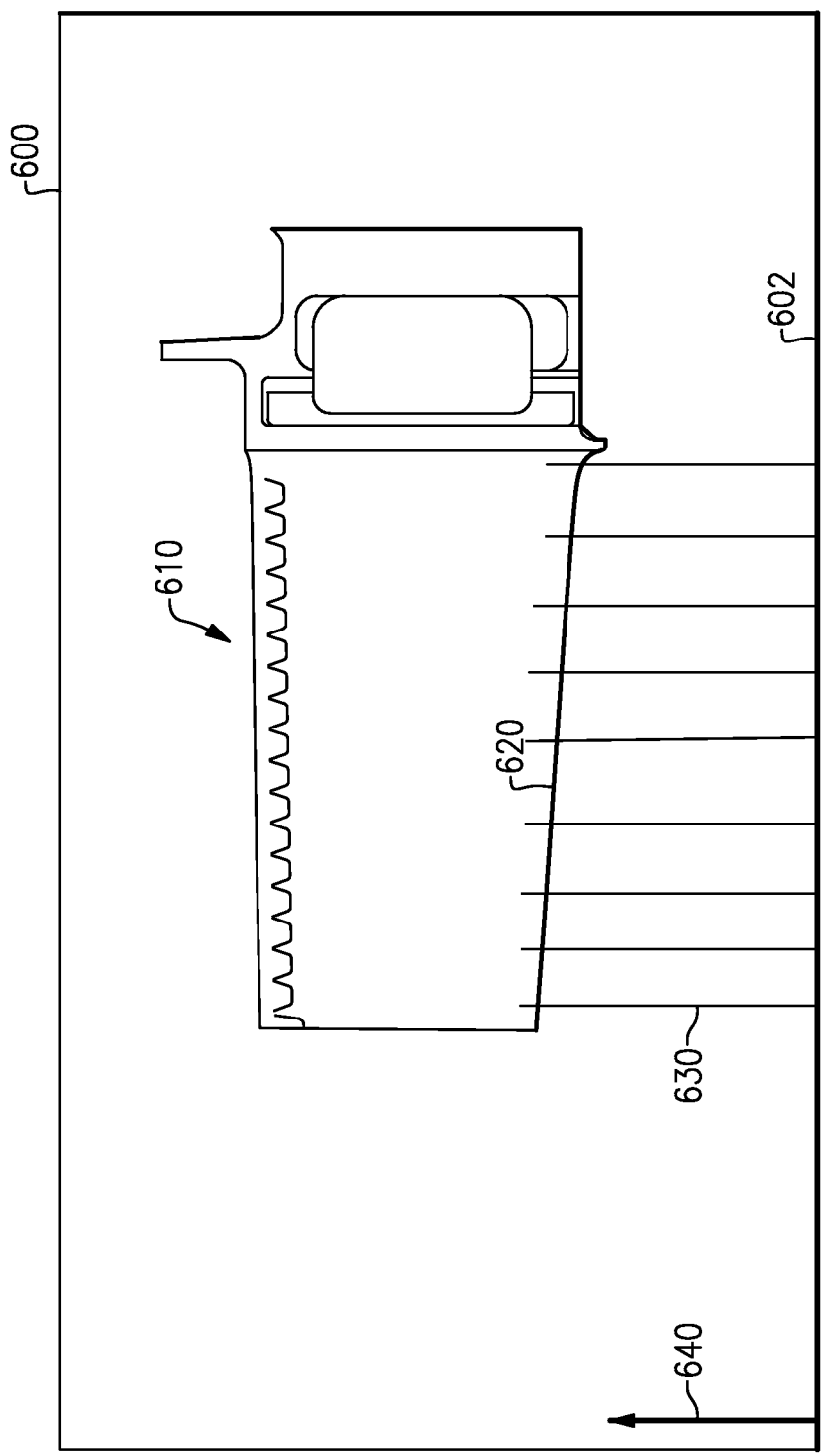
FIG. 7 schematically illustrates a build apparatus for constructing the blade of FIG. 2.

With continued reference to FIGS. 2-4, FIG. 5 illustrates the lattice structure 400 positioned on the exterior facing surface of the blade 130. FIG. 6 illustrates a cross sectional view of the lattice structure 400 of FIG. 5 along view lines C-C. The lattice structure 400 is formed of a series of interconnected walls 410 extending outward from an exterior facing surface 420 of the blade 130. In the example lattice structure 400, each of the walls 410 extends approximately normal to the exterior facing surface 420 on which the lattice structure 400 is disposed. In alternative examples, the lattice structure 400 can extend at an angle to the surface, with a component of the angle being normal to the exterior facing surface 420. While illustrated in FIG. 5 as a connected pattern of hexagons, practical implementations can utilize any interconnected shape, and the lattice structure 400 is not limited to the illustrated hexagonal shape.

A thermal barrier coating 430 is applied over the lattice structure 400. The thermal barrier coating 430 in this example is applied by first applying a metallic bondcoat and then applying a ceramic topcoat. In alternative examples, alternative thermal barrier coating application techniques can be utilized to similar effect. A depth 432 of the thermal barrier coating 430 normal to the exterior facing surface 420 is less than a height 412 of the normal component of the lattice structure 400. The surface area generated by the sides of the lattice structure 400 provides a greater surface for the thermal barrier coating to adhere to and reduces the occurrence of spallation.

In some examples, prior to application of the thermal barrier coating, the lattice structure 400 provides a surface roughness (Ra) of the exterior facing surface 420 in the range of 100-600 Ra. In other examples, the surface roughness provided by the lattice structure 400 is in the range of 180-600 Ra. As the thermal barrier coating 430 has a depth 432 greater than the height 412 of the lattice structure 400, the resultant surface roughness of the component after application of the thermal barrier coating 430 is significantly lower than the surface roughness of the exterior facing surface 420. The specific surface roughness of the thermal barrier coating 430 can be designed to a needed roughness according to known thermal barrier coating techniques. In some examples, the resultant surface roughness of the thermal barrier coating is less than 100 Ra.

With continued reference to FIGS. 2-6, FIG. 7 illustrates a completed blade 610 constructed in an additive metal manufacturing device 600.

Additive metal manufacturing typically utilizes lasers or electron beams to sinter particles in a 2D powder bed. Parts, such as the blade 610, are made by successively sintering layers upwards to form the component. In order to create overhanging structures using the additive metal manufacturing process, support material and frameworks must be utilized to maintain the orientation of the part. When removed from the part, the support structures leave remnant structures that are attached to, and integral to, the constructed part. The remnant structures are alternately referred to as artifacts. In existing systems the artifacts are removed in a finishing process.

In the illustrated example, the blade 610 is constructed with a leading edge 620 approximately parallel to a base 602 of the additive metal manufacturing device 600. Support structures 630 extend upward and contact/support the blade 610 as it is being constructed. As will be understood by one of skill in the art, the support structures 630 are constructed as a part of the additive metal manufacturing process.

In the illustrated example, the blade 610 and support structures 630 are constructed layer by layer beginning at the base and extending in a direction indicated by the arrow 640. Each of the support structures 630 contacts only the leading edge region of the blade 610. After the blade 610 is constructed via the additive metal manufacturing process, the support structures 630 are removed from the blade 610 via a finishing process. By halting the finishing process while a portion of the support structure 630 remains connected to the leading edge, the artifacts from the support structure 630 form the lattice structure described above. One of skill in the art, having the benefit of this disclosure, will understand methods by which to finish the blade 610 to a desired surface roughness such that an appropriately sized lattice structure remains.

In alternative examples, such as those where a lattice structure is desired across the entire surface of the blade 610, the support structures 630 can extend across the entire blade surface. In yet further alternative structures, a lattice structure can be constructed along any desired exterior surface of the blade 610 during the additive metal manufacturing process independent of the support structure.

While described above with general reference to application of a thermal barrier coating to a leading edge of a turbine blade, one of skill in the art will understand that the above described lattice structure applied to an exterior facing surface of a component can be utilized to increase adhesion of a thermal barrier coating to the exterior facing surface of any component and any surface, and is not limited to a leading edge of a turbine blade.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for manufacturing a gas path component for a gas powered turbine comprising:
   additively manufacturing a first component structure and a support structure, wherein the support structure is integral to the first component structure;
   partially removing the support structure via a finishing process such that an artifact of said support structure remains integral to said first component structure by applying the finishing process until a combined surface roughness of the first component structure and the artifact of the support structure has a combined surface roughness (Ra) in the range of 100-600; and
   applying a thermal barrier coating to said first component structure, wherein said thermal barrier coating is adhered to said first component structure and said artifact of said support structure.

2. The method of claim 1, wherein applying said thermal barrier comprises applying a metallic bondcoat and applying a ceramic topcoat.

3. The method of claim 1, wherein additively manufacturing the first component structure and the support structure comprises constructing a lattice structure on at least one external surface of the first component structure.

4. The method of claim 1, wherein the thickness of the thermal barrier coating is larger than a height of the artifact of the support structure normal to the surface of the first component structure on which the artifact of the support structure is disposed.

5. The method of claim 1, wherein the artifact of said support structure is disposed across less than 100% of the exterior surface of the first component structure.

* * * * *